US009955409B2

(12) United States Patent
Baek et al.

(10) Patent No.: US 9,955,409 B2
(45) Date of Patent: Apr. 24, 2018

(54) METHOD AND APPARATUS FOR DEVICE-TO-DEVICE COMMUNICATION

(71) Applicant: Samsung Electronics Co., Ltd., Gyeonggi-do (KR)

(72) Inventors: Youngkyo Baek, Seoul (KR); Kyeongin Jeong, Gyeonggi-do (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 14/781,283

(22) PCT Filed: Mar. 31, 2014

(86) PCT No.: PCT/KR2014/002712
§ 371 (c)(1),
(2) Date: Sep. 29, 2015

(87) PCT Pub. No.: WO2014/158006
PCT Pub. Date: Oct. 2, 2014

(65) Prior Publication Data
US 2016/0309401 A1 Oct. 20, 2016

(30) Foreign Application Priority Data
Mar. 29, 2013 (KR) .......................... 10-2013-0034530

(51) Int. Cl.
*H04W 48/16* (2009.01)
*H04W 48/14* (2009.01)
(Continued)

(52) U.S. Cl.
CPC .......... *H04W 48/16* (2013.01); *H04W 8/005* (2013.01); *H04W 48/14* (2013.01); *H04W 88/02* (2013.01)

(58) Field of Classification Search
CPC ....... H04L 67/04; H04W 4/005–4/008; H04W 4/02; H04W 4/06–4/08; H04W 8/005;
(Continued)

(56) References Cited

U.S. PATENT DOCUMENTS 9,462,567 B2 * 10/2016 Johnsson .............. H04W 8/005
455/426.1
9,532,224 B2 * 12/2016 Baek ..................... H04W 8/005
455/426.1
(Continued)

FOREIGN PATENT DOCUMENTS

KR 10-2012-0127643 11/2012
KR 10-2014-0096955 8/2014
(Continued)

OTHER PUBLICATIONS

International Search Report dated Jul. 30, 2014 in connection with International Patent Application No. PCT/KR2014/002712, 4 pages.
(Continued)

*Primary Examiner* — Timothy J Weidner

(57) ABSTRACT

Provided is a method and apparatus for device-to-device (D2D) communication, and, particularly, a method and apparatus for device-to-device (D2D) communication for discovering an adjacent UE through a network in a wireless cellular communication system. Provided are a method for performing device-to-device communication by a UE, and an apparatus therefor, the method including: transmitting a discovery request for discovering an adjacent UE to a server; scanning a discovery channel during a scanning time according to the discovery request; and performing the device-to-device communication with a discovered adjacent UE when the adjacent UE is discovered as a result of the scanning, wherein the discovery request is used for the server to transmit an announcement request to the adjacent UE corresponding to the discovery request, and the announcement
(Continued)

indication information includes information which allows the adjacent UE to broadcast a discovery signal through the discovery channel during the scanning time.

26 Claims, 6 Drawing Sheets

(51) Int. Cl.
*H04W 88/02* (2009.01)
*H04W 8/18* (2009.01)
*H04W 8/00* (2009.01)

(58) Field of Classification Search
CPC .............. H04W 8/186; H04W 12/04; H04W 40/24–40/248; H04W 48/08–48/16; H04W 72/0406–72/0433; H04W 76/002–76/007; H04W 84/18; H04W 84/22; H04W 88/02; H04W 88/04; H04W 88/06; H04W 92/18
See application file for complete search history.

(56) References Cited

U.S. PATENT DOCUMENTS

2012/0307774 A1 12/2012 Zhao et al.
2014/0056222 A1 2/2014 Zhu et al.
2014/0185529 A1 7/2014 Lim et al.
2014/0213250 A1 7/2014 Baek et al.

FOREIGN PATENT DOCUMENTS

WO WO 2012/136001 A1 10/2012
WO WO 2013/032251 A2 3/2013

OTHER PUBLICATIONS

Written Opinion of International Searching Authority dated Jul. 30, 2014 in connection with International Patent Application No. PCT/KR2014/002712, 5 pages.

Huawei, et al., "Architecture Consideration for Proximity Services with Infrastructure", SA WG2 Meeting #95, S2-130122, Prague, Czech Republic, Jan. 28-Feb. 1, 2013, 4 pages.

Qualcomm Incorporated, "Proposed Solution for Direct Discovery and Communication Using E-UTRAN", SA WG2 Meeting #95, S2-130308, Prague, Czech Republic, Jan. 28-Feb. 1, 2013, 10 pages.

Intel, III, et al, "Prioritising EPC Support of ProSe Communication Over WLAN", SA WG2 Meeting #95, S2-130323, Prague, Czech Republic, Jan. 28-Feb. 1, 2013, 3 pages.

Renesas Mobile Europe Ltd., "ProSe Key Issue—UE Discovery", SA WG2 Meeting #95, S2-130385, Prague, Czech Republic, Jan. 28-Feb. 1, 2012, 3 pages.

* cited by examiner

METHOD AND APPARATUS FOR DEVICE-TO-DEVICE COMMUNICATION

TECHNICAL FIELD

The present invention relates to a method and apparatus for device-to-device (D2D) communication, and, particularly, to a method and apparatus for device-to-device (D2D) communication for discovering an adjacent user equipment through a network in a wireless cellular communication system.

BACKGROUND ART

D2D communication refers to a communication mode in which enables a UE for D2D to directly perform data communication, without the help of a cellular network, when the UE has discovered a UE of interest to be adjoined thereto.

Communication providers are attempting to create profit by providing D2D communication utilizing an allowed frequency band unused thereby or wireless resources non-allocated to a cellular network and the like. Therefore, a method for providing D2D communication and controlling a D2D service on the basis of a cellular network has been sought.

However, since a UE for D2D must identify whether or not counterpart UEs of interest are adjoined thereto or the like, a method for discovering the counterpart UEs of interest is required for D2D communication. In this case, in order to discover a counterpart UE without using a cellular network, each UE for D2D must continuously broadcast its own information to the vicinities thereof and receive information broadcasted by adjacent UEs for D2D, so that much power consumption is predicted.

Therefore, for more efficient D2D communication, a method for discovering a counterpart UE for D2D of interest with reduced power consumption by using a cellular network is required.

DISCLOSURE OF INVENTION

Technical Problem

The present invention has been made in order to solve the above problems, and an object of the present invention is to provide an apparatus and method for efficiently discovering an adjacent UE in order to perform device-to-device communication.

Solution to Problem

In order to achieve the objects, according to an embodiment of the present invention, a method for discovering an adjacent UE may include: issuing, by a proximity service support application of a UE, a discovery request for discovering an adjacent UE; including, by the UE, information, such as an application ID, location information of the UE, and a scanning time for a discovery signal, in a discovery request, and then transferring the discovery request to a ProSe server; determining, by the ProSe server, cells which the ProSe server is to request to broadcast a discovery signal using the transferred information; transferring a discovery signal announcement request to a corresponding base station (e.g. an eNB) directly or via an EPC network (e.g. a mobility management entity (MME)); transmitting, by the base station, a discovery signal announcement request to all of ProSe support UEs, which are in a state of an idle mode or connected mode, through a broadcasted message (e.g. a system information block); including an application ID or discovery channel information in the discovery signal announcement request so as to be seen; and announcing, by a UE which has received the discovery signal announcement request, its own information, such as its own ProSe ID, application ID, and interest information, through the discovery channel information when the request includes an application in which the UE has been registered, and then performing, by a counterpart UE which has received the information broadcasted through the discovery channel, D2D communication with a UE of interest.

In order to achieve the objects, according to an embodiment of the present invention, a method for discovering an adjacent UE may include: a method for establishing a friend group of specific terminals according to each ProSe application; a method for modifying the friend group; a method for allocating a group encryption key with respect to each group through a ProSe server; a method for encrypting information on a discovery channel, which is notified from an eNB, using the allocated group encryption key; and a method for encrypting, by the UE, its own expression using the allocated group encryption key when broadcasting the own expression through a discovery channel so that information on the members of only a corresponding group can be acquired.

In more detail, a method for performing device-to-device communication according to the present invention includes a method for performing device-to-device communication by a UE, the method including: transmitting a discovery request for discovering an adjacent UE to a server; scanning a discovery channel during a scanning time according to the discovery request; and performing the device-to-device communication with a discovered adjacent UE when the adjacent UE is discovered as a result of the scanning.

In addition, a method for performing device-to-device communication according to the present invention includes a method for performing device-to-device communication by a UE, the method including: receiving, from a base station, announcement indication information for allowing the UE to broadcast a discovery signal for the device-to-device communication; determining whether the announcement indication information is for the UE based on information included in the announcement indication information; and broadcasting the discovery signal through a discovery channel during a scanning time according to the announcement indication information when the announcement indication information is for the UE.

In addition, a method for performing device-to-device communication according to the present invention includes a method for managing device-to-device communication by a base station, the method including: receiving, from a server, an announcement request for allowing at least one UE, which performs the device-to-device communication, to broadcast a discovery signal for the device-to-device communication; and transmitting announcement indication information to at least one UE which exists in a cell according to the announcement request, wherein the announcement indication information is created on the basis of a discovery request received from a UE which is to perform the device-to-device communication.

Advantageous Effects of Invention

In accordance with the present invention, an adjacent UE can be discovered without necessary power consumption in device-to-device communication, and a group of UEs for device-to-device communication can be formed, so that the device-to-device communication can be efficiently performed.

MODE FOR THE INVENTION

Hereinafter, exemplary embodiments of the present invention will be described with reference to the accompanying drawings. In the following description, a detailed description of known functions and configurations which may obscure the subject matter of the present invention will be omitted. In addition, although the present invention is described with an evolved packet core (EPC) network, i.e. one LTE network, as an example of a cellular network, the embodiments of the present invention can be applied to any wireless data communication network other than the LTE network.

The present invention relates to a method and apparatus for discovering a counterpart user equipment (hereinafter, referred to as a "UE") (i.e. an adjacent UE) existing at a short distance when a UE is to make D2D communication.

Hereinafter, the embodiments of the present invention will be described about a method for discovering a counterpart UE existing at a short distance in order to perform D2D communication on the basis of an EPC network. Although the present specification mainly illustrates an EPC network, another-type core of a cellular-based network may be substituted for the function of the EPC.

Figure 1:
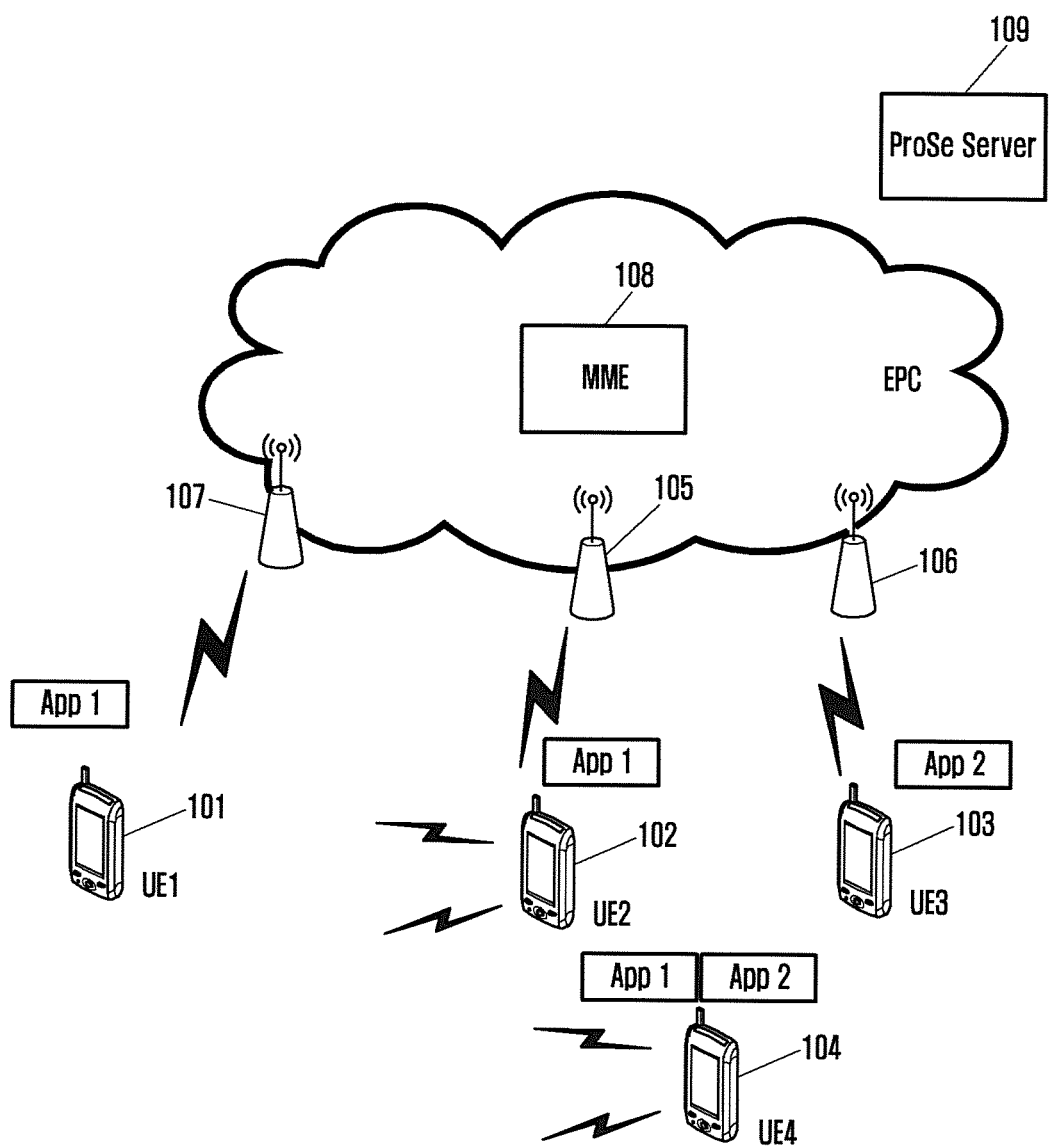
FIG. 1 is a diagram illustrating the configuration of an EPC network-based wireless communication system in which D2D communication can be applied according to the present invention.

FIG. 1 is a diagram illustrating the configuration of an EPC network-based wireless communication system in which D2D communication can be applied according to the present invention.

Referring to FIG. 1, in a wireless communication system, a ProSe server 109 provides a proximity service in cooperation with an evolved packet core (EPC) or a mobility management entity (MME) 108.

At least one UE 101, 102, 103 or 104 existing in the wireless communication system may store an application for device-to-device communication. A ProSe application installed in the UE 101, 102, 103 or 104 is provided with a proximity service, such as a request to discover an adjacent UE through communication with the ProSe server 109, from the ProSe server 109.

For example, UE1 101 with application 1 installed therein may request the ProSe server 109 to discover an adjacent UE, the ProSe server 109 directly or indirectly may broadcast a discovery signal broadcast request through a base station 107 around UE1 101, and adjacent UEs, among UEs which have received the request of the base station 107, corresponding to the discovery request may broadcast the expression thereof. The expression may include information, such as a ProSe ID of an adjacent UE, an application ID, a matter of interest, and the like. Such expression may correspond to a discovery signal for D2D communication.

In this case, a UE broadcasting expression may use the same application (application 1) as that used in UE1 101, which has transmitted a discovery request to an adjacent UE corresponding to the discovery request.

For example, since UE2 102 and UE4 104 are UEs in which application 1 identical to application 1 of UE1 101 which has requested the discovery is registered, UE2 102 and UE4 104 broadcast the expression thereof. In contrast, since UE3 103 in which application 1 has not been registered does not correspond to the discovery request, UE3 103 does not broadcast the expression thereof.

According to an embodiment, an adjacent UE corresponding to the discovery request may be configured to automatically broadcast the expression thereof according to the setup thereof, without a separate user input. In addition, an adjacent UE corresponding to the discovery request may be configured to determine whether to broadcast the expression thereof depending on an input of a user, or an upper stage, e.g. an application stage.

Figure 2:
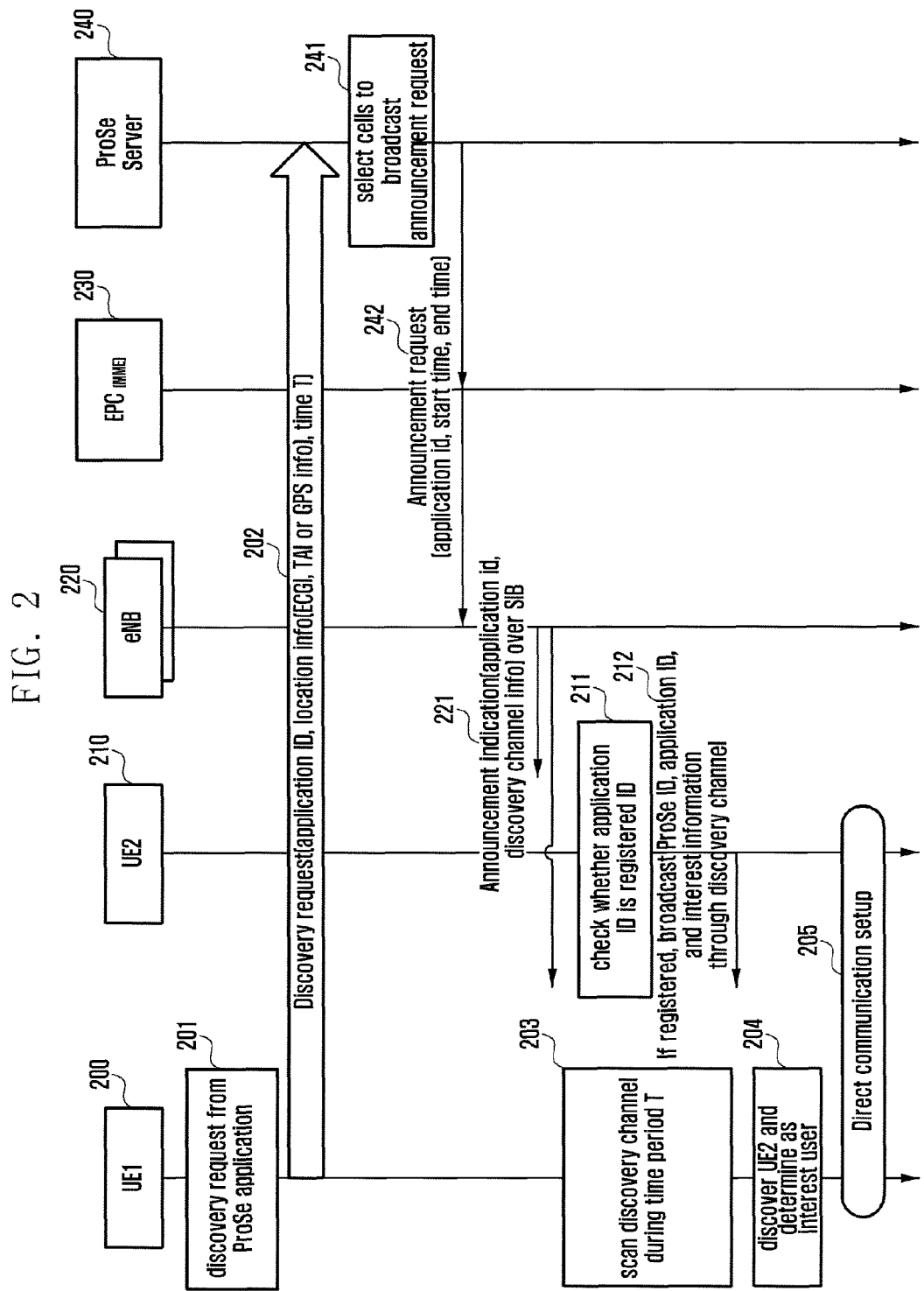
FIG. 2 is a flowchart showing an adjacent UE discovery process in a device-to-device communication method according to an embodiment of the present invention.

UE1 101 which has received the expression broadcasted by adjacent UEs identifies information on adjacent UEs, and sets D2D communication with an adjacent UE of interest when necessary. That is to say, UE1 101 discovers UE2 102, UE4 104 and the like through scanning, and attempts D2D communication with a specific UE of interest among the discovered adjacent UEs. FIG. 2 is a flowchart showing an adjacent UE discovery process in a device-to-device communication method according to an embodiment of the present invention.

Referring to FIG. 2, UE1 200 determines to send a discovery request for an adjacent UE through a pre-installed ProSe application at step 201, and transfers the request to a ProSe server 240 at step 202.

In this case, the discovery request may include an ID (application ID) of an application requesting a discovery, location information of UE1 200, and information on time to scan discovery signals (or expression of other UEs) to be broadcasted by other UEs. UE1 200 transmits a discovery request including the aforementioned information to the ProSe server 240. The location information may include at least one among E-UTRAN Cell Global Identifier (ECGI), Tracking Area Identity (TAI), and GPS information on a cell in which the UE stays. In addition, the discovery request may include an identifier representing the class or group of a UE to be discovered, instead of the ID (application ID) of the application. In addition, the discovery request may include an identifier representing the class or group of a UE to be discovered, together with the ID (application ID) of the application.

The ProSe server 240, which has received the discovery request, selects areas (e.g. cells) in which other UEs are to be requested to broadcast the expression thereof for discovery at step 241.

Next, the ProSe server 240 transmits an announcement request message directly to eNBs 220 which exist in the selected areas at step 242. Otherwise, the ProSe server 240 indirectly may transmit information on the selected areas to an EPC 230, e.g. an MME so that the MME can transfer the announcement request message to the corresponding areas.

Here, the announcement request message may include an ID (i.e. application ID) of an application which has sent a discovery request. In addition, the announcement request message may include information on a period for which UEs are to broadcast the expression thereof for discovery, or information on a period for which the respective cells broadcast an announcement request to UEs. The values of the periods may be calculated by making reference to a scanning time sent by UE1 200.

In addition, when the discovery request includes an identifier representing the class or group of a UE to be discovered, instead of the ID (application ID) of the application, the announcement request message includes the identifier representing the class or group of a UE to be discovered, instead of the ID (application ID) of the application. Otherwise, the discovery request includes an identifier representing the class or group of a UE to be discovered, together with the ID (application ID) of the application, the announcement request message includes the identifier representing the class or group of a UE to be discovered, together with the ID (application ID) of the application.

The eNB 220 which has received the announcement request message transmits an announcement indication to UEs included in the cell thereof at step 221.

In this case, the eNB 220 may include the announcement indication in a system information block (SIB).

The announcement indication includes an ID (i.e. application ID) of an application which has sent the discovery request, or information representing which application has issued a discovery request. In addition, the announcement indication may include information on a discovery channel which a UE receiving the announcement indication is to use to broadcast the expression thereof.

In addition, when the discovery request includes an identifier representing the class or group of a UE to be discovered, instead of the ID (application ID) of the application, the announcement indication includes the identifier representing the class or group of a UE to be discovered, instead of the ID (application ID) of the application. Otherwise, the discovery request includes an identifier representing the class or group of a UE to be discovered, together with the ID (application ID) of the application, the announcement indication includes the identifier representing the class or group of a UE to be discovered, together with the ID (application ID) of the application.

In addition, the entire of a part of the announcement indication may be encrypted using an encryption key received from a ProSe server, or an encryption key derived from the received encryption key. For example, when UEs receive mutually different encryption keys according to applications from the ProSe server 240 and use the received encryption keys, the eNB 220 may encrypt information on only a discovery channel using the encryption keys or encryption keys derived from the encryption keys. Accordingly, the eNB 220 enables only UEs which have installed and registered the corresponding application to acquire information on the discovery channel from the announcement indication, and to broadcast the expression thereof using the acquired discovery channel. Meanwhile, when the announcement indication includes information on the discovery channel, UE1 200 which has sent the discovery request scans the corresponding discovery channel by making reference to the included information on the discovery channel as well.

Through the processes, UE2 210, which is a ProSe terminal receiving the announcement indication from the SIB, determined whether or not the application ID included in the announcement indication is identical to an application installed and registered in UE2 210 at step 211. That is to say, UE2 210 determines whether or not the announcement indication is for itself.

When the application ID included in the announcement indication is not installed in UE2 210, UE2 210 determines that an application other than an application installed in UE2 210 has sent a discovery request, and thus ignores the announcement indication. In contrast, when the application ID corresponds to an application installed and registered in UE2 210, UE2 210 which is a ProSe terminal broadcasts the expression thereof through a discovery channel at step 212.

In addition, when the discovery request includes an identifier representing the class or group of a UE to be discovered, it is determined whether or not the identifier, included in the announcement indication, representing the class or group of a UE to be discovered corresponds to a group or class allocated to UE2 210, it is determined whether or not received announcement indication is for UE2 210, and ignores the announcement indication when there is no correspondence.

UE1 200, which has sent the discovery request, scans expression broadcasted by other UEs through a discovery channel during a scanning time set on the discovery request, or during a predetermined period of time acquired by making reference to the announcement indication sent through an SIB from the eNB 220. In addition, UE1 200 can identify information on adjacent UEs from the received expression.

By scanning, UE1 200 discovers UE2 210 which is a UE of interest at step 204. Accordingly, UE1 200 attempts D2D communication with UE1 200 at step 205 when necessary.

According to an embodiment, when an adjacent UE or a UE of interest has not been discovered during the scanning time, UE1 200 may terminate the discovery. Otherwise, when an adjacent UE or a UE of interest has not been discovered during the scanning time, UE1 200 may perform a rediscovery. Specifically, UE1 200 may again transmit a discovery request to the ProSe server 240, and repeatedly perform the aforementioned discovery process. In this case, UE1 200 may repeatedly perform the rediscovery a preset number of times.

When a UE or a UE of interest has not been discovered as a result of consecutive discovery and rediscovery performances, UE1 200 may terminate the discovery. UE1 200 may notify a user of information indicating that an adjacent UE has not been discovered through a ProSe application via a text display, a voice output, a vibration output, or the like. Meanwhile, when an application appointed in the announcement indication received from the eNB 220 has been installed and registered, even a UE, i.e. UE2 210, which has not sent the discovery request, other than UE1 200 may receive the broadcasted expression and identify information on adjacent UEs.

Figure 3:
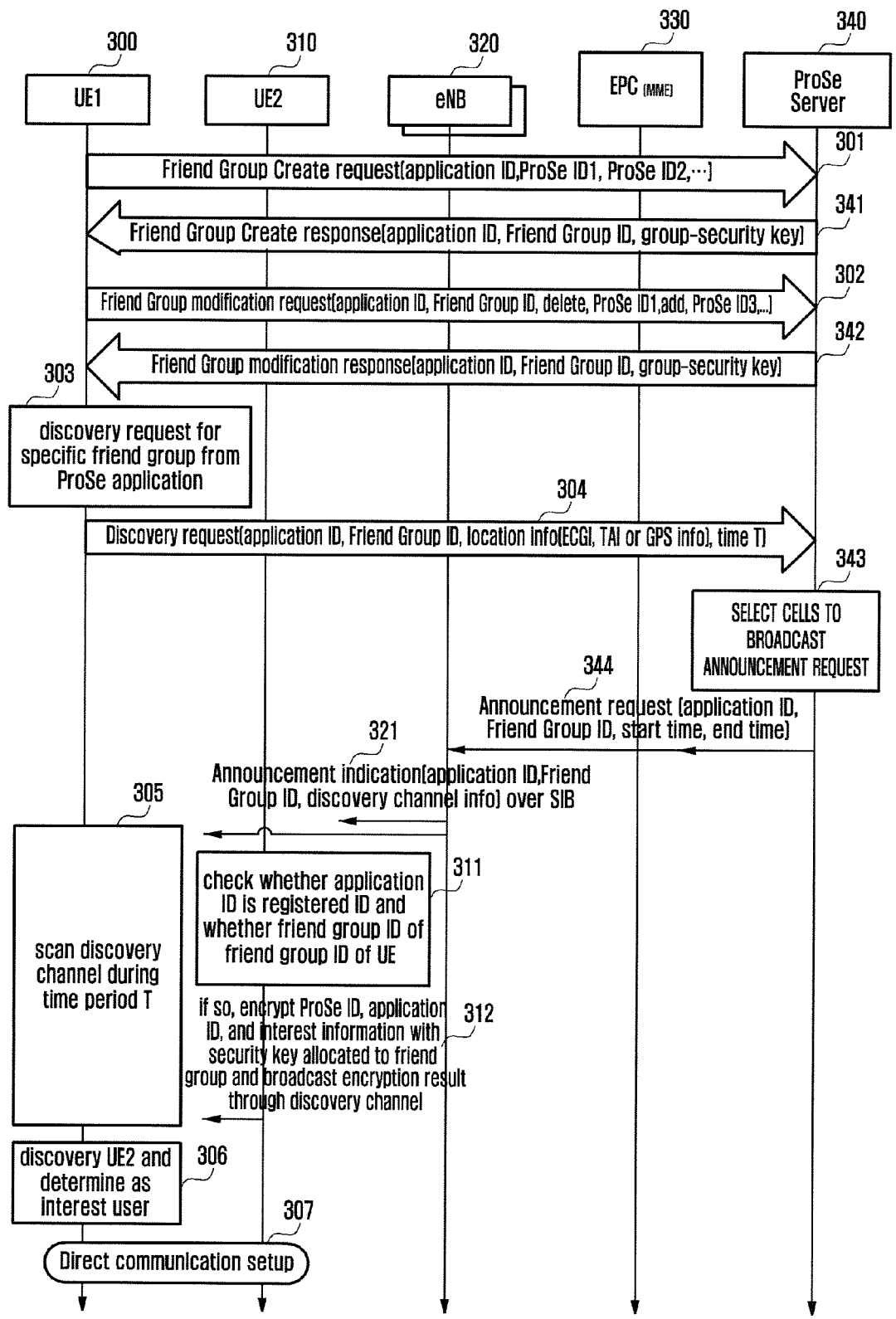
FIG. 3 is a flowchart showing a group generation, modification and group-by-group discovery process for device-to-device communication in a device-to-device communication method according to an embodiment of the present invention.

FIG. 3 is a flowchart showing a group generation, modification and group-by-group discovery process for device-to-device communication in a device-to-device communication method according to an embodiment of the present invention.

Referring to FIG. 3, UE1 300 may communicate with a ProSe server 340 through a pre-installed ProSe application, and may create and modify a group, i.e. a friend group thereof, which is to perform D2D communication. The friend group may include at least another UE, i.e. one or more group members, as the components thereof.

First, a process of creating a group will be described.

UE1 300 transmits a Friend Group Create request including a list of other UEs to be included in a group, i.e. a list of friends desired to be created as a group thereof, through a ProSe application to the ProSe server 340 at step 301.

The Friend Group Create request is a list other UEs, and may include ProSe server identifiers of other UEs, e.g. ProSe ID1, ProSe ID2, and the like. UE1 300 transmits a Friend Group Create request message to the ProSe server 340.

The ProSe server 340 which has received the request allocates an identifier, i.e. a friend group ID, to a group created in response to the request. In addition, the ProSe server 340 allocates an encryption key, i.e. a group-security key, to be used in the friend group for the created group. Then, the ProSe server 340 transmits the group identifier, i.e. the friend group ID, and the encryption key, i.e. the group-security key information, to be used in the friend group to corresponding group members, i.e. to UEs in the list of UEs to be included in the group. According to an embodiment, the ProSe server 340 may perform an approval process of UEs which UE1 300 desires to include in a group. The ProSe server 340 may transmit information on whether or not to approve to be included in the group, to UEs which exist in the list of UEs. In addition, the ProSe server 340 may receive information on approval or disapproval from UEs. The ProSe server 340 may transmit, to UE1 300, information on approval or disapproval of UEs desired to be included in the group, and may determine group members of the group to be created on the basis of the approval or disapproval.

The ProSe server 340 may transmit a Friend Group Create response to UE1 300 at step 341. In this case, the Friend Group Create response may include a group identifier, an encryption key, and the like, which are allocated to the group by the ProSe server 340.

When a friend group has been created through the process as described above, UE1 300 may modify the created friend group.

Specifically, UE1 300 transmits a friend group modification request to the ProSe server 340 through a ProSe application at step 302.

The friend group modification request may include an identifier, i.e. a friend group ID, of a group desired to be modified by UE1 300. In addition, the friend group modification request may include information on other UEs, i.e. information on friends, desired to be added to or deleted from the friend group, for example, may include information indicating that ProSe ID 1 is deleted, ProSe ID3 is added, or the like.

The ProSe server 340 which has received the request may allocate a new encryption key, i.e. a group-security key, to be used in the friend group. In addition, in order to notify each group member of updated information, the ProSe server 340 may transfer information on the group identifier, i.e. a friend group ID, and a new encryption key, i.e. a group-security key, to be used in the friend group to corresponding group members. When necessary, the ProSe server 340 may notify friends excluded from the group of a state in which the friends are excluded from the group through a message.

The ProSe server 340 may transmit a friend group modification response to UE1 300 at step 342. In this case, the friend group modification response may include a group identifier of a modified group, a modified encryption key, and the like.

Next, UE1 300 determines to send a discovery request to a specific friend group through a pre-installed ProSe application at step 303, and transfers a discovery request to the ProSe server 340 at step 304.

In this case, the discovery request may include an ID (i.e. application ID) of an application requesting a discovery, and an identifier of the specific friend group, i.e. a friend group ID. In addition, the discovery request may include location information of UE1 300, and information on time to scan discovery signals to be broadcasted by other UEs. The location information may include E-UTRAN Cell Global Identifier (ECGI), Tracking Area Identity (TAI), or GPS information on a cell in which the UE stays.

The ProSe server 340 which has received the discovery request selects areas (e.g. cells) which the ProSe server 340 is to request to broadcast expression for discovery at step 343, and transmits an announcement request message directly to a corresponding eNB 320 at step 344. Otherwise, the ProSe server 340 may be configured: to transfer information on selected areas, which the ProSe server 340 is to request to broadcast expression for discovery, to an EPC 330, e.g. an MME; and to allow the MME to transfer an announcement request message to corresponding cells.

Here, the announcement request message may include an ID (i.e. application ID) of an application which has sent the discovery request, and a group identifier (friend group ID) representing that the message is for a specific friend group or an identifier representing that the message is for a part of a group identifier or a specific group. In addition, the announcement request message may include information on a period of time during which UEs are to broadcast the expression thereof for discovery, or information on a period of time during which the respective cells broadcast an announcement request to UEs. The values of the periods of time may be calculated by making reference to a scanning time sent by UE1 300.

The eNB 320 which has received the announcement request message transmits an announcement indication to UEs which exist in the cell thereof at step 321.

Specifically, the eNB 320 may include the announcement indication in a system information block (SIB), and transmit the announcement indication to the UEs which exist in the cell thereof.

The announcement indication may include an ID (i.e. application ID) of an application which has sent the discovery request, or information representing which application has issued a discovery request. In addition, the announcement indication may include a group identifier (friend group ID) representing that the indication is for a specific friend group, or an identifier representing that the indication is for a part of a group identifier or a specific group. In addition, the announcement indication may include information on a discovery channel which a UE receiving the announcement indication is to use to broadcast the expression thereof. In addition, the entire of a part of the announcement indication may be encrypted using an encryption key received from the ProSe server 340, or an encryption key derived from the received encryption key. For example, when UEs receive mutually different encryption keys according to applications from the ProSe server 340 and use the received encryption keys, the eNB 320 may encrypt information on only a discovery channel using the encryption keys or encryption keys derived from the encryption keys. Accordingly, the eNB 320 enables only UEs which have installed and registered the corresponding application to acquire information on the discovery channel, and to broadcast the expression thereof using the acquired discovery channel.

For another example, when UEs receive an encryption key, which is allocated to a specific friend group of an application, from the ProSe server 340, and use the received encryption key, the eNB 320 may encrypt information on only a discovery channel using the encryption key or an encryption key derived from the encryption key so that only members of the specific friend group among UEs, which have installed and registered the corresponding application, can acquire information on the discovery channel and broadcast the expression thereof through the discovery channel.

Meanwhile, when the announcement indication includes information on a discovery channel, UE1 300 which has sent the discovery request scans a corresponding discovery channel by making reference to the included information on the discovery channel as well. Through the processes, UE2 310, a ProSe terminal, which has received announcement indication from the SIB, determines whether or not the application ID included in the announcement indication is identical to an application installed and registered in UE2 310, and whether or not information on a friend group included in the announcement indication is identical to a friend group in which UE2 310 has registered at step 311.

As a result of the determination, when it is determined that the discovery request is sent for an application non-installed in UE2 310 or for a group in which UE2 310 is not included, UE2 310 ignores the received announcement indication.

In contrast, when it is determined that the application ID corresponds to an application installed and registered in UE2 310, and that the discovery request is for a friend group to which UE2 310 belongs, UE2 310, which is a ProSe terminal, broadcasts its own expression through a discovery channel at step 312. In this case, its own expression is encrypted using an encryption key allocated to the friend group or an encryption key derived from the allocated encryption key, and then is broadcasted.

UE1 300, which has sent the discovery request, scans expression broadcasted by other UEs through a discovery channel during a scanning time set on the discovery request, or during a predetermined period of time obtained by making reference to the announcement indication sent through an SIB from the eNB 320, and thus can identify information on adjacent UEs from the received expression. For example, UE1 300 discovers UE2 310, which is a UE of interest, at step 306. Accordingly, when necessary, UE1 300 attempts D2D communication with UE2 310 at step 307.

Meanwhile, when application appointed in an announcement indication received from an eNB has been installed and registered in a UE, and the announcement indication is for a friend group in which the UE is included, the UE may receive expression broadcasted from other UEs and identify information on adjacent UEs although the UE is not a UE which has sent the discovery request.

The devices, i.e. a UE, an eNB, configuration entities (e.g. an MME) of an EPC, and a ProSe server, which are used in the embodiments of the present invention, may individually include a communication unit and a control unit. The communication units of the UE, the eNB, the configuration entities (e.g. an MME) of the EPC, and the ProSe server transmit and receive signals for performing an operation according to any one of the aforementioned embodiments. The control units of the UE, the eNB, the configuration entities (e.g. an MME) of the EPC, and the ProSe server control the respective devices to operate according to any one of the aforementioned embodiments.

Hereinafter, the configurations of a UE and a base station to which the present invention is applied will be described in more detail.

Figure 4:
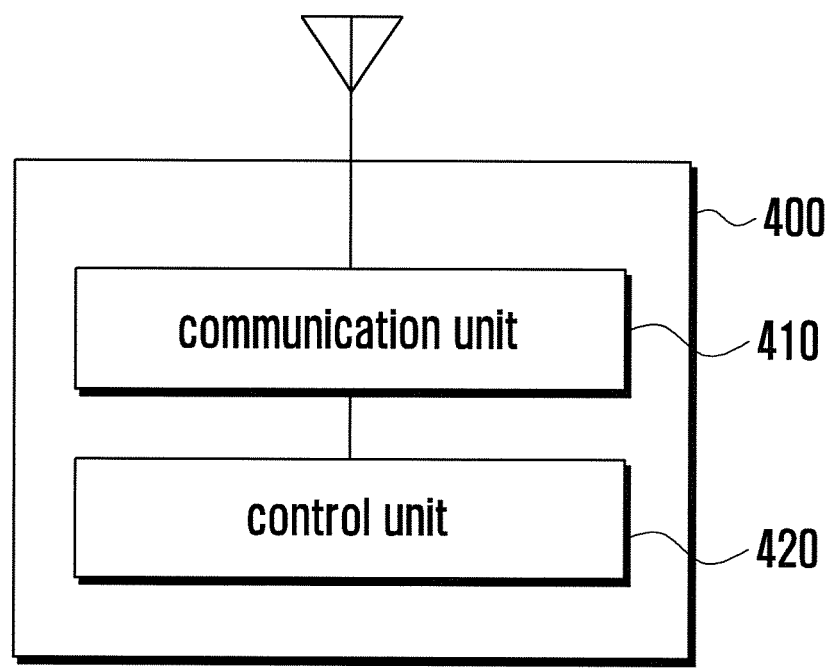
FIG. 4 is a block diagram illustrating the configuration of a UE according to an embodiment of the present invention.

FIG. 4 is a block diagram illustrating the configuration of a UE according to an embodiment of the present invention.

A UE 400 shown in FIG. 4 may correspond to UE1 according to the aforementioned embodiments.

The UE 400 may be configured to include a communication unit 410 and a control unit 420.

The communication unit 410 performs data communication with a ProSe server or with an adjacent UE discovered for device-to-device communication.

The control unit 420 controls the communication unit 410 to transmit a discovery request for discovering an adjacent UE to the ProSe server. In addition, the control unit 420 scans a discovery channel during a scanning time according to a discovery request, and sets a connection for device-to-device communication with a discovered adjacent UE when the adjacent UE is discovered as a result of the scanning.

In this case, the discovery request may include at least one among an identifier of an application which has requested a discovery for the adjacent UE, location information, of the UE, and the scanning time. In addition, the location information of the UE may include at least one among E-UTRAN Cell Global Identifier (ECGI), Tracking Area Identity (TAI), and GPS information.

In addition, the discovery request may include an identifier representing a group or class of a UE to be discovered, instead of an ID (application ID) of an application. Otherwise, the discovery request may include an identifier representing a group or class of a UE to be discovered, in addition to the ID (application ID) of the application.

In addition, the control unit 420 transmits a Group Create request for creating a device-to-device communication group to the ProSe server, and controls the communication unit 410 to receive a Group Create response from the ProSe server. In this case, the Group Create request may include an identifier of an application which has requested the device-to-device communication group to be created, and/or a server identifier of another UE to be included in the device-to-device communication group. In addition, a Group Create response may include an identifier of a created device-to-device communication group and/or an encryption key for the device-to-device communication group.

In addition, the control unit 420 controls the communication unit 410 to transmit a group modification request for modification of the device-to-device communication group to the ProSe server, and to receive a group modification response from the ProSe server. In this case, the group modification request may include an identifier of the device-to-device communication group and/or a server identifier of another UE added to or deleted from the device-to-device communication group. In addition, the group modification response may include an identifier of the device-to-device communication group and/or an encryption key for the device-to-device communication group.

Figure 5:
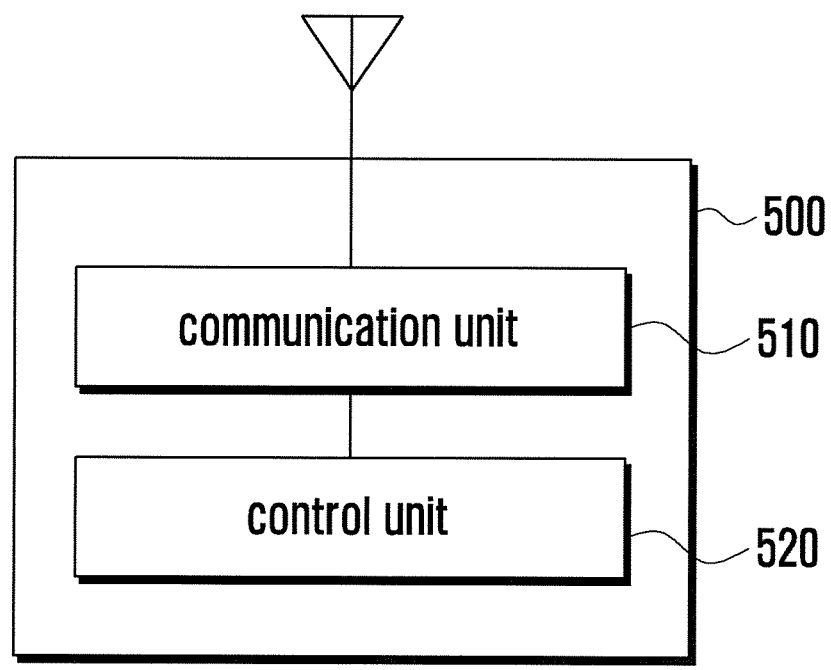
FIG. 5 is a block diagram illustrating the configuration of a UE according to another embodiment of the present invention.

FIG. 5 is a block diagram illustrating the configuration of a UE according to another embodiment of the present invention.

A UE 500 shown in FIG. 5 may correspond to UE2 according to the aforementioned embodiments.

The UE 500 may be configured to include a communication unit 510 and a control unit 520.

The communication unit 510 performs data communication with a base station or with another UE which performs device-to-device communication.

When receiving announcement indication information for broadcasting a discovery signal for the device-to-device communication from a base station, the control unit 520 determines whether or not the announcement indication information is for the UE 500. In this case, the announcement indication information may include an application identifier of a UE which has requested a discovery for an adjacent UE, and/or information on the scanning time. In addition, the announcement indication information may be received through a system information block (SIB).

The control unit 520 may determine whether or not an application corresponding to an application identifier included in announcement indication information exists in the UE 500.

As a result of the determination, when the announcement indication information is for the UE 500, the control unit 520 controls the communication unit 510 to broadcast the discovery signal through a discovery channel during a scanning time according to the announcement indication information.

Through the communication unit 510, the control unit 520 may receive a group identifier of a device-to-device communication group and an encryption key for the device-to-device communication group. In this case, the announcement indication information may include a group identifier of the device-to-device communication group, and the control unit 520 may determine whether or not the group identifier corresponds to a group identifier of the UE.

Figure 6:
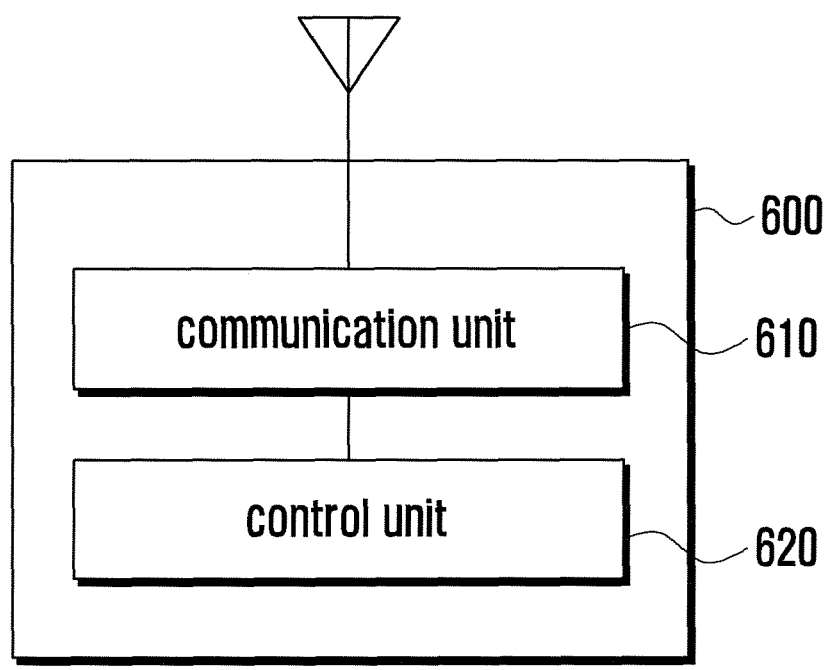
FIG. 6 is a block diagram illustrating the configuration of a base station according to an embodiment of the present invention.

FIG. 6 is a block diagram illustrating the configuration of a base station according to an embodiment of the present invention.

A base station 600 may include a communication unit 610 and a control unit 620.

The communication unit 610 performs data communication with a ProSe server or with at least one UE which performs device-to-device communication.

When receiving an announcement request from a ProSe server, the control unit 620 controls the communication unit 610 to transmit announcement indication information to at least one UE existing in a cell on the basis of the announcement request. In this case, the announcement indication information is created on the basis of a discovery request received from a UE which is to perform device-to-device communication.

The announcement request includes an application identifier of a UE which has requested a discovery for an adjacent UE and/or a scanning time during which the adjacent UE is discovered.

The announcement indication information includes an identifier of an application which has requested a discovery for an adjacent UE, and/or a discovery channel through which the adjacent UE is discovered. In addition, the announcement indication information may be transmitted through a system information block (SIB). In addition, when an announcement request includes a group identifier of a device-to-device communication group, the announcement indication information may include the group identifier.

The invention claimed is:

1. A method for performing device-to-device (D2D) communication by a terminal, the method comprising:
    transmitting, to a server, a discovery request to discover an adjacent terminal, wherein the discovery request includes information on a scanning time;
    receiving, from a base station, announcement indication information during a broadcast period determined based on the scanning time, wherein the announcement indication information includes information on a discovery channel;
    scanning the discovery channel during the scanning time; and
    performing the D2D communication with the discovered adjacent terminal, when the adjacent terminal is discovered as a result of the scanning,
    wherein the discovery request is used by the server to transmit an announcement request to the base station and to determine the broadcast period based on the scanning time.

2. The method of claim 1, wherein the discovery request includes at least one of an identifier of an application that has requested a discovery for the adjacent terminal, location information of the terminal, and the scanning time.

3. The method of claim 2, wherein the location information of the terminal comprises at least one of a E-UTRAN Cell Global Identifier (ECGI), a Tracking Area Identity (TAI), and GPS information on a cell in which the terminal stays.

4. The method of claim 1, further comprising, before transmitting the discovery request:
    transmitting a group create request for creating a D2D communication group to the server; and
    receiving a group create response from the server.

5. The method of claim 4, wherein the group create request comprises at least one of an identifier of an application that has requested the D2D communication group to be created, and a server identifier of another terminal to be included in the D2D communication group, and
    wherein the group create response comprises at least one of an identifier of a created D2D communication group, and an encryption key for the D2D communication group.

6. The method of claim 4, further comprising:
    transmitting a group modification request for modifying the D2D communication group to the server; and
    receiving a group modification response from the server.

7. The method of claim 6, wherein the group modification request comprises at least one of an identifier of the D2D communication group and a server identifier of another terminal to be added to or deleted from the D2D communication group, and
    wherein the group modification response comprises at least one of an identifier of the D2D communication group and an encryption key for the D2D communication group.

8. A method for performing device-to-device (D2D) communication by a terminal, the method comprising:
    receiving, from a base station, announcement indication information during a broadcast period determined based on a scanning time to allow the terminal to transmit a discovery signal for the D2D communication, wherein the announcement indication information includes information on a discovery channel and information on the scanning time;
    determining whether the announcement indication information is for the terminal, based on information included in the announcement indication information; and
    transmitting the discovery signal through the discovery channel during the scanning time according to the announcement indication information, when the announcement indication information is for the terminal.

9. The method of claim 8, wherein the announcement indication information further comprises an identifier of an application that has requested a discovery for an adjacent terminal.

10. The method of claim 9, wherein determining whether the announcement indication information is for the terminal comprises determining whether an application corresponding to the identifier of the application is installed in the terminal.

11. The method of claim 8, wherein the announcement indication information is received through a system information block (SIB).

12. The method of claim 8, further comprising
receiving a group identifier of a D2D communication group and an encryption key for the D2D communication group from the base station.

13. The method of claim 8, wherein the announcement indication information comprises a group identifier of a D2D communication group, and
wherein determining whether the announcement indication information is for the terminal comprises determining whether the group identifier corresponds to a group identifier of the terminal.

14. A method for managing device-to-device (D2D) communication by a base station, the method comprising:
receiving, from a server, an announcement request to allow at least one terminal that performs the D2D communication to broadcast a discovery signal for the D2D communication; and
transmitting announcement indication information to a terminal according to the announcement request during a broadcast period determined based on a scanning time,
wherein the announcement indication information allows the terminal to broadcast the discovery signal during the scanning time, and allows a terminal transmitted a discovery request to the server to scan the discovery signal during the scanning time to perform the D2D communication.

15. The method of claim 14, wherein the announcement request comprises at least one of an identifier of an application that has requested a discovery for an adjacent terminal, and the scanning time during which the adjacent terminal is to be discovered.

16. The method of claim 14, wherein the announcement indication information comprises at least one of an identifier of an application that has requested a discovery for an adjacent terminal, and a discovery channel through which the adjacent terminal is to be discovered.

17. The method of claim 16, wherein the announcement indication information is transmitted through a system information block (SIB).

18. The method of claim 16, wherein the announcement indication information comprises a group identifier of a D2D communication group when the announcement request comprises the group identifier.

19. A terminal for performing device-to-device (D2D) communication, the terminal comprising:
a transceiver configured to perform a data communication with a server and with an adjacent terminal; and
a controller coupled with the transceiver and configured to:
control the transceiver to transmit a discovery request to discover the adjacent terminal to a server, wherein the discovery request includes information on a scanning time,
control the transceiver to receive, from a base station, announcement indication information during a broadcast period determined based on the scanning time, wherein the announcement indication information includes information on a discovery channel,
scan the discovery channel during the scanning time, and
perform the D2D communication with a discovered adjacent terminal, when the adjacent terminal is discovered as a result of the scanning,
wherein the discovery request is used by the server to transmit an announcement request to the base station and to determine the broadcast period based on the scanning time.

20. The terminal of claim 19, wherein the controller is further configured to control the transceiver to transmit, to the server, a group create request for creating a D2D communication group, and a group modification request for modifying the D2D communication group after creation of the D2D communication group.

21. A terminal for performing device-to-device (D2D) communication, the terminal comprising:
a transceiver configured to perform a data communication with a base station and with another terminal; and
a controller coupled with the transceiver and configured to:
control the transceiver to receive, from the base station, announcement indication information during a broadcast period determined based on a scanning time to allow the terminal to transmit a discovery signal for the D2D communication, wherein the announcement indication information includes information on a discovery channel and information on the scanning time, and
determine whether the announcement indication information is for the terminal, based on information included in the announcement indication information, and
control the transceiver to transmit the discovery signal through the discovery channel during the scanning time according to the announcement indication information, when the announcement indication information is for the terminal.

22. The terminal of claim 21, wherein the announcement indication information is received through a system information block (SIB).

23. The terminal of claim 21, wherein the controller is further configured to control the transceiver to receive a group identifier of a D2D communication group and an encryption key for the D2D communication group.

24. A base station for managing device-to-device (D2D) communication, the base station comprising:
a transceiver configured to perform a data communication with a server and with at least one terminal; and
a controller coupled with the transceiver and configured to:
control the transceiver to receive, from a server, an announcement request to allow at least one terminal that performs the D2D communication to broadcast a discovery signal for the D2D communication, and
control the transceiver to transmit announcement indication information to a terminal according to the announcement request during a broadcast period determined based on a scanning time,
wherein the announcement indication information allows the terminal to broadcast the discovery signal during the scanning time, and allows a terminal transmitted a discovery request to the server to scan the discovery signal during the scanning time to perform the D2D communication.

25. The base station of claim 24, wherein the controller is further configured to control the transceiver to transmit the announcement indication information through a system information block (SIB).

26. The base station of claim 24, wherein the announcement indication information comprises a group identifier of a D2D communication group when the announcement request comprises the group identifier.

\* \* \* \* \*